(12) United States Patent
Lu et al.

(10) Patent No.: US 12,158,618 B2
(45) Date of Patent: Dec. 3, 2024

(54) TELECOMMUNICATIONS LANYARD

(71) Applicant: CommScope Technologies LLC, Hickory, NC (US)

(72) Inventors: Yu Lu, Eden Prairie, MN (US); Ryan Kostecka, Waconia, MN (US)

(73) Assignee: CommScope Technologies LLC, Hickory, NC (US)

( * ) Notice: Subject to any disclaimer, the term of this patent is extended or adjusted under 35 U.S.C. 154(b) by 246 days.

(21) Appl. No.: 17/955,967

(22) Filed: Sep. 29, 2022

(65) Prior Publication Data

US 2023/0099400 A1    Mar. 30, 2023

Related U.S. Application Data

(60) Provisional application No. 63/249,851, filed on Sep. 29, 2021.

(51) Int. Cl.
*G02B 6/38* (2006.01)

(52) U.S. Cl.
CPC ......... *G02B 6/3849* (2013.01); *G02B 6/3825* (2013.01); *G02B 6/3869* (2013.01)

(58) Field of Classification Search
None
See application file for complete search history.

(56) References Cited

U.S. PATENT DOCUMENTS

| | | | |
|---|---|---|---|
| 10,101,538 B2 | 10/2018 | Lu et al. | |
| 2007/0031103 A1* | 2/2007 | Tinucci | G02B 6/3849 385/139 |
| 2019/0011641 A1* | 1/2019 | Isenhour | G02B 6/4432 |

FOREIGN PATENT DOCUMENTS

WO    2021041305 A1    3/2021

* cited by examiner

*Primary Examiner* — Jerry Rahll
(74) *Attorney, Agent, or Firm* — Merchant & Gould P.C.

(57) ABSTRACT

An assembly having a protective part including a cap or a plug, a fiber optic component adapted to mate with the protective part and a lanyard. The lanyard has a first end attached to the protective part and a second end attached to the fiber optic component. One of the first and second ends of the lanyard includes a loop defined by a loop member. The loop has a plurality of undulations. The undulations are moveable between a first state and a second state. The undulations are at least partially straightened in a circumferential orientation as the undulations move from the first state to the second state. An inner cross-dimension of the loop is larger when the undulations are in the second state as compared to the first state, and wherein a resiliency of the loop biases the undulations toward the first state.

10 Claims, 5 Drawing Sheets

TELECOMMUNICATIONS LANYARD

CROSS-REFERENCE TO RELATED APPLICATION

This application claims the benefit of U.S. Provisional Application No. 63/249,851, filed Sep. 29, 2021, and titled "TELECOMMUNICATIONS LANYARD" the disclosure of which is hereby incorporated herein by reference.

TECHNICAL FIELD

The present disclosure relates generally to various fiber optic components.

BACKGROUND

Lanyards are used in the telecommunications industry to link protective caps or plugs to structures such as fiber optic connectors. Example lanyards are shown in U.S. Pat. No. 10,101,538 and in PCT Publication Number WO2021/041305.

SUMMARY

Aspects of the present disclosure relate to lanyards for use in the telecommunications industry. The lanyard described herein includes a small attachment loop which is expandable and strong when secured to a component.

In one aspect, the present disclosure relates to an assembly. The assembly includes a protective part which includes a cap or a plug, a fiber optic component adapted to mate with the protective part and a lanyard that has a first end attached to the protective part and a second end attached to the fiber optic component. At least one of the first and second ends includes a loop defined by a loop member. The loop has a plurality of undulations. The undulations are moveable between a first state and a second state. The undulations are at least partially straightened in a circumferential orientation as the undulations move from the first state to the second state, additionally, an inner cross-dimension of the loop is larger when the undulations are in the second state as compared to the first state, and a resiliency of the loop biases the undulations toward the first state.

In some examples, the undulations have inner peaks that face toward a center of the loop and outer valleys that face away from a center of the loop.

In some examples, the cross-dimension is defined through the center of the loop between opposite ones of the peaks.

In some examples, the inner peaks define an inner diameter of the loop.

In some examples, the fiber optic component is a fiber optic connector. In some examples, the fiber optic connector includes a connector body having a front end at which a ferrule is positioned, wherein the ferrule supports at least one optical fiber, wherein the fiber optic connector includes a rotatable fastener mounted over the connector body, wherein the protective part is configured to mount over the front end of the connector body, and wherein the rotatable fastener is configured to secure the protective part in place over the front end of the connector body. In other examples, the fiber optic connector further comprises a shroud that mounts over the connector body, the shroud having a front keying feature adapted for rotationally keying the fiber optic connector with respect to a mating fiber optic port, and wherein the protective part fits over the front keying feature when secured to the fiber optic connector by the rotatable fastener.

In some examples, the loop mounts within an outer circumferential groove defined by the rotatable fastener.

In some examples, the lanyard has a one-piece unitary construction, and wherein the lanyard has a plastic composition.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular examples of the present disclosure and therefore do not limit the scope of the present disclosure. Examples of the present disclosure will hereinafter be described in conjunction with the appended drawings, wherein like numerals denote like elements.

DETAILED DESCRIPTION

Figure 1:
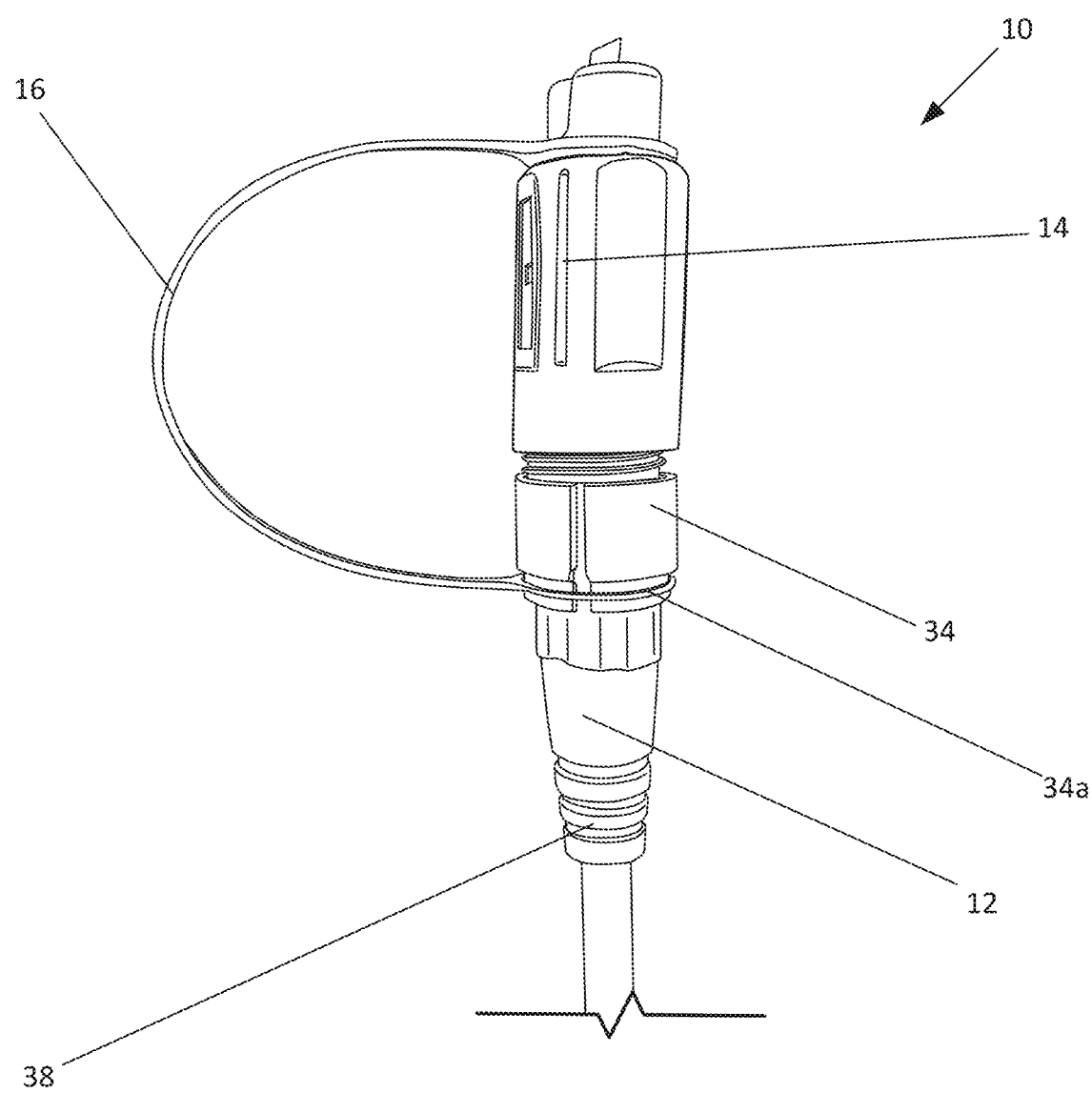
FIG. 1 is a fiber optic connector in accordance with the principles of the present disclosure, the fiber optic connector is mated with a protective cap, a lanyard is attached to both the fiber optic connector and the protective cap.

Various examples will be described in detail with reference to the drawings, wherein like reference numerals represent like parts and assemblies throughout the several views.

The present disclosure relates generally to lanyards (e.g., device for holding two items together) for use with various components and parts in the telecommunications industry. More specifically, the present disclosure relates to a lanyard having a small attachment loop which is expandable and has a high relative strength when secured to a component.

Figure 2:
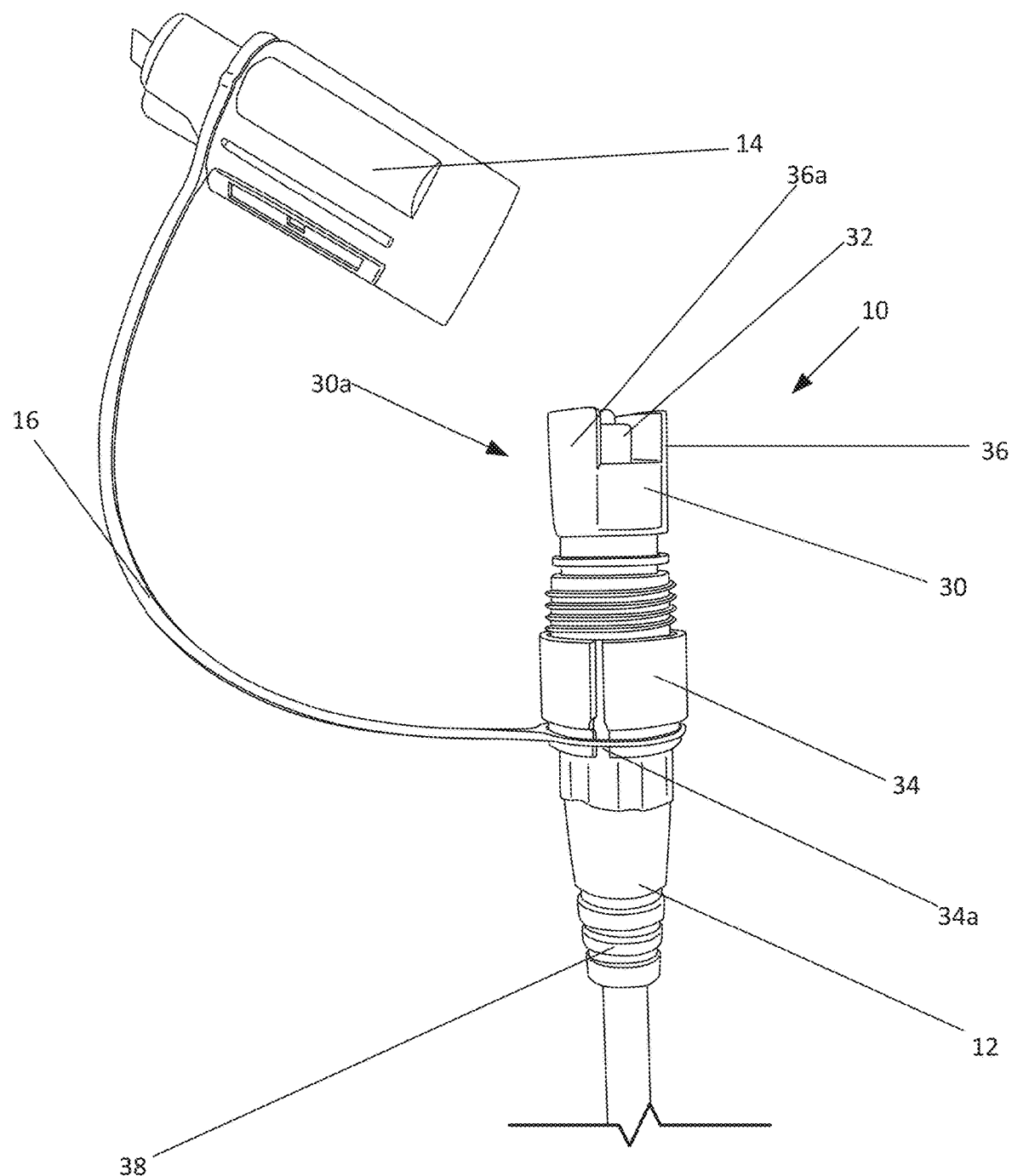
FIG. 2 is the fiber optic connector of FIG. 1 with the protective cap removed.

Referring to FIGS. 1 and 2, an assembly 10 is shown, the assembly 10 includes a fiber optic component, in this example the fiber optic component is a fiber optic connector 12. The assembly 10 additionally includes a protective part which is mateable with the fiber optic component, in this example the protective part is a dust cap 14. A lanyard 16 is used to keep the fiber optic component and the protective part together when they are not mated (see FIG. 2). The lanyard 16 has a first end 18 attached to the dust cap 14 and a second end 20 connected to the fiber optic connector 12.

In some examples, the fiber optic component is a structure such as an enclosure or a fiber optic adapter. In some other examples, the fiber optic component is a female fiber optic connector which defines a port for receiving a male fiber optic connector and the protective part is a protective plug that is mounted to seal the port when the port is not in use.

As can be seen in FIG. 2, the fiber optic connector 12 includes a connector body 30 having a front end 30a. A ferrule 32 is shown positioned at the front end 30a and a boot 38 is shown below the connector body 30. The ferrule 32 supports at least one optical fiber. The fiber optic connector 12 additionally includes a rotatable fastener 34 mounted over the connector body 30. The dust cap 14 is configured to mount over the front end 30a of the connector body 30 and the rotatable fastener 34 is configured to secure the dust cap 14 in place to protect the ferrule from dust or other foreign material. The fiber optic connector 12 additionally includes a shroud 36 including a front keying feature 36a adapted for rotationally keying the fiber optic connector 12 with respect to a mating fiber optic port. The dust cap 14 fits over the front keying feature 36a when secured to the fiber optic connector 12 by the rotatable fastener 34.

Figure 3:
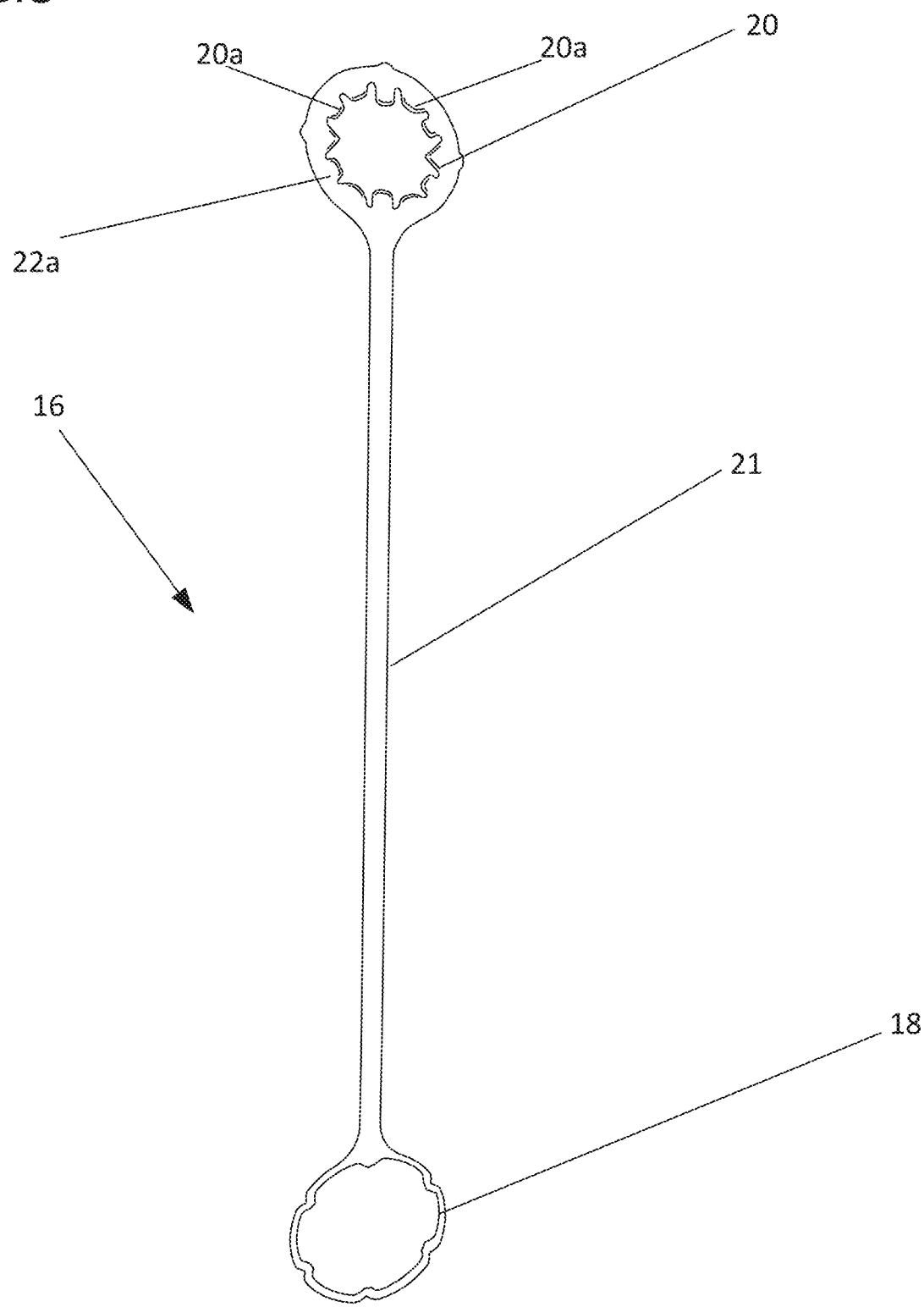
FIG. 3 is the lanyard of FIG. 1.
Figure 4:
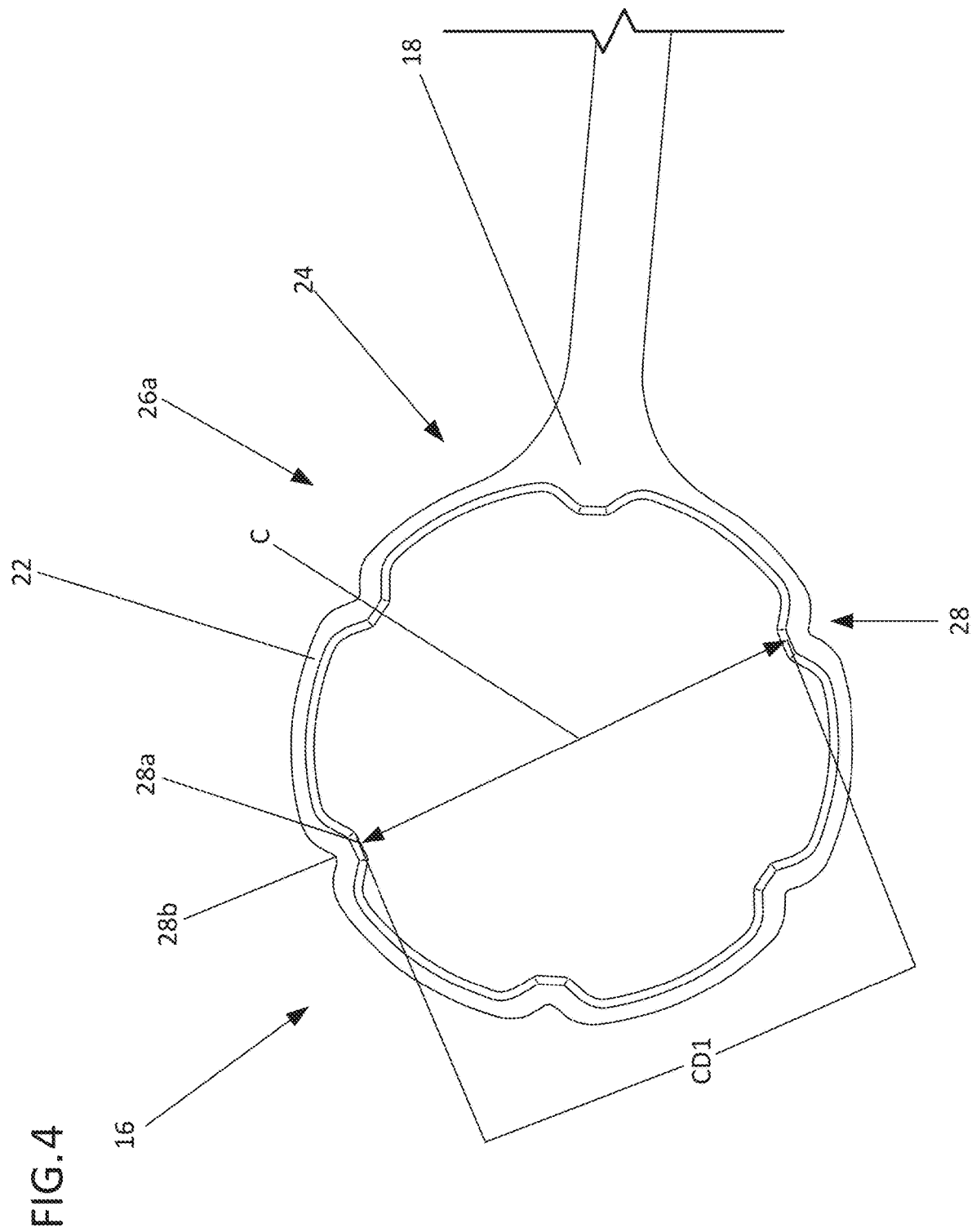
FIG. 4 is a close-up view of an end of the lanyard of FIG. 3 in a first state.
Figure 5:
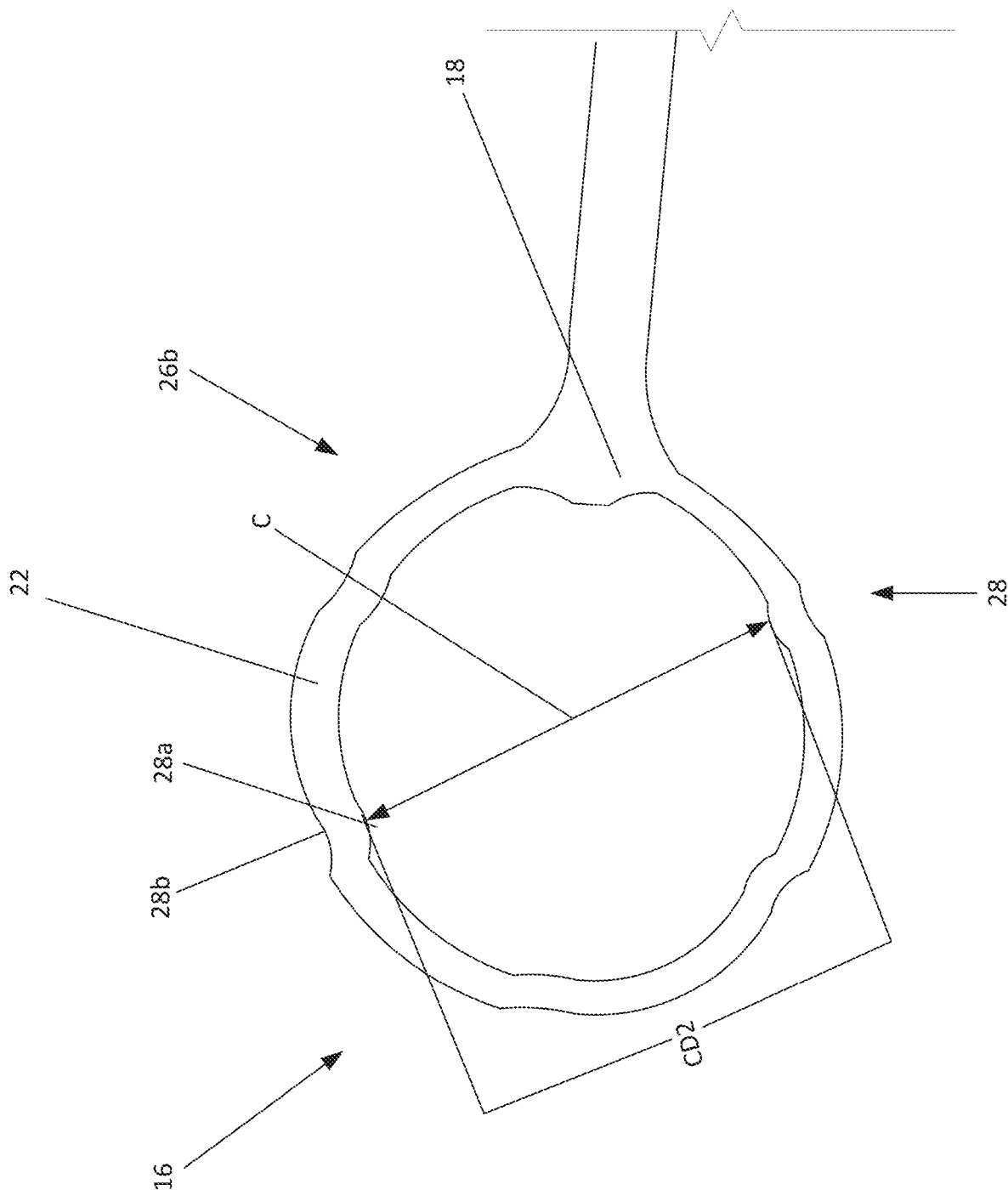
FIG. 5 is the lanyard of FIG. 4 in a second state.

FIGS. 3-5 show the lanyard 16 in isolation. The lanyard 16 is made in a one-piece unitary construction from a plastic composition (e.g., a plastic composition that may include a Nylon material such as Nylon 66). The first end 18 and second end 20 are separated by a straight member 21. The first end 18 includes a loop 22 defined by a loop member 24. The loop member 24 includes a plurality of undulations 28. The undulations 28 include inner peaks 28a that face towards a center C of the loop 22. The inner peaks 28a oppose outer valleys 28b which face away from the center C of the loop 22. The undulations 28 are movable between a first state 26a and a second state 26b. The undulations 28 are partially straightened when moved from the first state 26a (see FIGS. 3 and 4) to the second state 26b (see FIG. 5). The loop 22 includes an inner cross-dimension CD1 when the undulations 28 are in the first state 26a and a different inner cross-dimension CD2 when the undulations 28 are in the second state 26b. The cross-dimension CD2 of the second state 26b is larger than the cross-dimension CD1 of the first state 26a. The loop 22 is resilient and biases the undulations 28 to the first state 26a. The cross-dimensions CD1 and CD2 are defined through the center C of the loop 22 between opposite inner peaks 28a. The in some examples, the inner peaks 28a define an inner diameter of the loop 22.

The second end 20 includes a plurality of resilient teeth 20a. The resilient teeth 20a are circumferentially aligned in a loop 22a. The resilient teeth 20a can be deflected allowing the second end 20 attach to a component such as the dust cap 14. The resilient teeth 20a bias back towards a normal position. As can be seen at FIGS. 1 and 2 the resilient teeth 20a fit within a groove at the top of the dust cap 14. The loop 22a of the second end 20 must have a cross dimension that is larger than a cross-dimension of the area or groove which the loop is attached to for the resilient teeth 20a to properly mate.

As can be seen in FIG. 2, the loop 22 of the lanyard 16 is mounted within a circumferential groove 34a, the circumferential groove 34a has an outer diameter. The circumferential groove 34a is defined by the rotatable fastener 34. The loop 22 can mate within the circumferential groove 34a with minimal protrusion from the circumferential groove 34a. The cross-dimension CD1 of the first state 26a can be smaller than the diameter of the circumferential groove 34a. The cross-dimension CD2 of the second state 26b, however, must be larger than the cross-dimension of the circumferential groove 34a in order to fit the loop 22 around the circumferential groove 34a. In some examples, the cross-dimension of the loop 22 when the loop 22 is attached is larger than the cross-dimension CD1 but smaller than the cross-dimension CD2. The lanyard 16 can be nearly flush with the rotatable fastener 34 to maintain a small profile. In other examples, the lanyard 16 can be attached to the boot 38. In other examples, the loop 22 can be attached to the shroud 36 or other portions of the connector or fiber optic component. In some examples, both the first and the second end 20 include a loop 22 with a plurality of undulations 28. Other variations are additionally possible (e.g., both ends including only the second end including a loop with a plurality of undulations similar to the loop 22).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An assembly comprising:
a protective part including a cap or a plug;
a fiber optic component adapted to mate with the protective part; and
a lanyard having a first end attached to the protective part and a second end attached to the fiber optic component, at least one of the first and second ends including a loop defined by a loop member having a plurality of undulations, wherein the undulations are moveable between a first state and a second state, wherein the undulations are at least partially straightened in a circumferential orientation as the undulations move from the first state to the second state, wherein an inner cross-dimension of the loop is larger when the undulations are in the second state as compared to the first state, and wherein a resiliency of the loop biases the undulations toward the first state.

2. The assembly of claim 1, wherein the undulations have inner peaks that face toward a center of the loop and outer valleys that face away from a center of the loop.

3. The assembly of claim 2, wherein the cross-dimension is defined through the center of the loop between opposite ones of the peaks.

4. The assembly of claim 2, wherein the inner peaks define an inner diameter of the loop.

5. The assembly of claim 1, wherein the fiber optic component is a fiber optic connector.

6. The assembly of claim 5, wherein the fiber optic connector includes a connector body having a front end at which a ferrule is positioned, wherein the ferrule supports at least one optical fiber, wherein the fiber optic connector includes a rotatable fastener mounted over the connector body, wherein the protective part is configured to mount over the front end of the connector body, and wherein the rotatable fastener is configured to secure the protective part in place over the front end of the connector body.

7. The assembly of claim 6, wherein the fiber optic connector further comprises a shroud that mounts over the connector body, the shroud having a front keying feature adapted for rotationally keying the fiber optic connector with respect to a mating fiber optic port, and wherein the protective part fits over the front keying feature when secured to the fiber optic connector by the rotatable fastener.

8. The assembly of claim 6, wherein the loop mounts within an outer circumferential groove defined by the rotatable fastener.

9. The assembly of claim 1, wherein the lanyard has a one-piece unitary construction, and wherein the lanyard has a plastic composition.

10. The assembly of claim 9, wherein the plastic composition includes Nylon.

\* \* \* \* \*